(12) United States Patent
Huang

(10) Patent No.: US 11,291,294 B1
(45) Date of Patent: Apr. 5, 2022

(54) MAGNETICALLY DRIVEN ELECTRIC TOOTHBRUSH HEAD

(71) Applicant: Shenzhen E-WORLD Technology Limited, Shenzhen (CN)

(72) Inventor: Xiangyu Huang, Shenzhen (CN)

(73) Assignee: SHENZHEN E-WORLD TECHNOLOGY LIMIIED, Shenzhen (CN)

( * ) Notice: Subject to any disclaimer, the term of this patent is extended or adjusted under 35 U.S.C. 154(b) by 0 days.

(21) Appl. No.: 17/552,368

(22) Filed: Dec. 16, 2021

(51) Int. Cl.
| | |
|---|---|
| *A61C 17/34* | (2006.01) |
| *A46B 15/00* | (2006.01) |
| *A46B 5/00* | (2006.01) |
| *A46B 13/02* | (2006.01) |

(52) U.S. Cl.
CPC ........ *A46B 15/0026* (2013.01); *A46B 5/0095* (2013.01); *A46B 13/02* (2013.01); *A61C 17/3481* (2013.01); *A46B 2200/1066* (2013.01)

(58) Field of Classification Search
CPC ............ A61C 17/3481; A61C 17/3418; A46B 15/0026; A46B 5/0095; A46B 13/02
See application file for complete search history.

(56) References Cited

U.S. PATENT DOCUMENTS 7,067,945 B2 * 6/2006 Grez ..................... B26B 19/282
310/47

* cited by examiner

*Primary Examiner* — Shay Karls
(74) *Attorney, Agent, or Firm* — Andrew C. Cheng

(57) ABSTRACT

A magnetically driven electric toothbrush head includes a brush body, a movable board and a screw cap with a cavity. A fixed frame is arranged in the cavity. Two spaced twisting plates are connected between the fixed frame and the movable board. The movable board is connected with a driving shaft extending through the fixed frame and the elastic cover is fixedly connected with the brush body. The bottom of the movable board is provided with permanent magnets. When the screw cap is connected to the brush handle, under the magnetic effect between the electromagnet and the permanent magnets and the distortion restriction of the twisting plates, the movable board drives the driving shaft and the brush body to rotate reciprocatingly and synchronously. The lower part of the twisting plate is exposed to form a twisting section which is connected to the driving shaft via a rubber strip.

10 Claims, 9 Drawing Sheets

MAGNETICALLY DRIVEN ELECTRIC TOOTHBRUSH HEAD

TECHNICAL FIELD

The present disclosure relates to the technical field of electric toothbrush heads, in particular to a magnetically driven electric toothbrush head.

BACKGROUND

With the continuous improvement of the quality of life, electric toothbrushes have been vigorously promoted by the market. A typical electric toothbrush includes a brush head that produces high-frequency vibration through rapid rotation or vibration of a vibration unit, such that the toothpaste is instantly decomposed into tiny bubbles which penetrate into and thus clean crevices between teeth. At the same time, the vibration of bristles of the brush can promote the blood circulation of the mouth and has a massage effect on the gingival tissue.

The electric toothbrush includes the brush handle and the electric toothbrush head. At present, there are two ways for the brush handle to drive the electric toothbrush head to vibrate. The first is driven by vibration, concretely, the top of the brush handle is provided with a vibration unit. The vibration unit is directly inserted into the electric toothbrush head, and then the vibration of the vibration unit drives the electric toothbrush head to vibrate. The second is driven by magnetism, that is to say, an electromagnet is set in the brush handle, and a permanent magnet is set on the brush head of the electric tooth. Through the magnetic drive between the electromagnet and the permanent magnet, the brush handle is driven to rotate reciprocatingly.

In the existing technology, as for the magnetically driven electric toothbrush head, because the reciprocating rotation amplitude of the toothbrush head is not large enough, the use effect of electric toothbrush head is poor.

SUMMARY

It is desired to provide an improved magnetically driven electric toothbrush head.

The present invention provides a magnetically driven electric toothbrush head which comprises a brush body, a movable board arranged movably, and a screw cap. The screw cap has a cavity inside; a top of the screw cap has a top opening in communication with the cavity; an upper end of the brush body is provided with brush hair; the brush body is arranged above the screw cap, and an elastic cover is arranged between a lower end of the brush body and an upper end of the screw cap. Wherein a fixed frame is fixed inside the cavity of the screw cap, the movable board is movable reciprocating laterally after magnetic drive, two twisting plates are arranged in intervals between the fixed frame and the movable board, an upper end of the twisting plate is fixedly connected with the fixed frame and a lower end of the twisting plate is fixedly connected with the movable board, and a resistance of the twisting plate to distortion is less than the resistance to bending. Wherein the movable board is connected with a driving shaft, a lower end of the driving shaft is fixedly connected with the movable board, an upper end of the driving shaft extends upward through the fixed frame and the elastic cover and fixedly connected with a lower end of the brush body, the driving shaft is spaced from the fixed frame and the elastic cover respectively. Wherein a bottom of the movable board is provided with two permanent magnets, a lower end of the screw cap is fixed and connected to an upper end of a brush handle, when an electromagnet in the tooth handle is electrified, under a magnetic effect between the electromagnet and the two permanent magnets and a distortion limit of the twisting plates, the movable board drives the driving shaft and the brush body to rotate synchronously and reciprocatingly. Wherein an upper outer of the twisting plate is provided with a rubber sleeve to form a limiting section, a top of the rubber sleeve is fixedly connected with a bottom of the fixed frame, a lower part of the twisting plate is exposed to form a twisting section, when the twisting plate is twisted, a twisting amplitude of the twisting section is greater than that of the limiting section, a middle part of the twisting section is connected to the driving shaft with a rubber strip, one end of the rubber strip is fixedly connected to the driving shaft, and the other end of the rubber strip is wrapped in a middle part of the twisting section, and the rubber strip is movably connected to the twisting section.

In some embodiments, the movable board is provided, on its top, with an elastic plate with horizontal distortion due to compression, the elastic plate is movably arranged on the movable board, a lower end of the twisting section extends through the elastic plate and is fixedly connected with the elastic plate, a sector-shaped guide groove with an arc outer wall is defined in the elastic plate, the driving shaft movably moves through the arc-shape guide groove, and a radian of the arc-shaped outer wall of the sector-shaped guide groove is same as that of the reciprocating rotation of the driving shaft.

In some embodiments, an inner side of the sector-shaped guide groove has a short inner wall, an outer side of the sector-shaped guide groove has a long outer wall, a limit groove is defined in a middle of the short inner wall, the driving shaft is flat, an inner side of the driving shaft is embedded in the limit groove and is connected with an inner side of the limit groove, an outer side of the driving shaft is oriented towards the long outer wall, and a gap is formed between the driving shaft and the long outer wall. When the electromagnet in the brush handle is energized, under a magnetic effect between the electromagnet and the two permanent magnets and a twisting restriction of the twisting plate, and the outer side of the driving shaft rotates reciprocatingly with its inner side as a rotation center.

In some embodiments, a bottom end of the brush body has a ring bottom portion oriented downward, the elastic cover has a ring top portion abutting against the ring bottom portion of the brush body, an upper ring groove is defined in the ring bottom portion and is upward depressed, a lower ring groove is defined in the ring top portion and is downward depressed, and the upper ring groove is aligned with the lower ring groove. Wherein the upper ring groove is provided with a rolling ball that is capable of rolling circumferentially along the upper ring groove, and a lower side of the rolling ball is movably placed in the lower ring groove.

In some embodiments, a bottom end of the elastic cover has an annular step oriented downward, the annular step is connected to a top of the screw cap and is arranged around a top opening of the cavity, a connection part extends downward from the bottom end of the elastic cover, and the connection part extends through the top opening of the cavity, surrounds the periphery of the fixed frame, and is fixedly connected with the fixed frame.

In some embodiments, the driving shaft has a flat inserting section that extends upward through the elastic cover, a connecting channel is defined in the brush body for insertion of the flat inserting section, the connecting channel is arranged longitudinally and extends through a bottom of the brush body to form an insertion opening at the bottom of the brush body, a through groove transversely extends through the brush body, the through groove is filled with elastic rubber block which is in a compressed state. Wherein, a pressing wall is formed between the through channel and the connecting channel, the pressing wall has an internal pressing surface facing the connecting channel and an external pressing surface facing the through channel, a central part of the internal pressing surface is convexed towards the connecting channel to form a pressing bulge, the brush body has a limiting wall opposite to the pressing wall, and the pressing wall and the limiting wall are arranged on opposite sides of the through channel respectively. Wherein an inner side wall of the connecting channel has a straight pressing surface which is arranged facing to the internal pressing surface, the straight pressing surface extends along the axial direction of the connecting channel, the inserting section has two opposite insertion sides, and when the inserting section is inserted into the connecting channel via the insertion opening, one of the insertion sides of the inserting section contacts and abuts against the straight pressing surface, and the other of the insertion sides of the inserting section abuts against the pressing bulge.

In some embodiments, a thickness of the limiting wall is greater than that of the pressing wall.

In some embodiments, the through groove forms a groove opening on the outer wall of the brush body, the elastic rubber block has an end layer that seals the groove opening, the end layer is hardened, and an outer edge of the end layer is fixedly connected with the outer wall of the brush body.

In some embodiments, the pressing wall is curved, a middle part of the external pressing surface of the pressing wall is depressed toward the connecting channel to form a concaved groove corresponding to the pressing bulge, and the elastic rubber block fills the concaved groove.

In some embodiments, the external pressing surface has an end section in upper and lower parts of the concaved groove, the end section extends to the concaved groove and connects with the sidewall of the concaved groove, and along the extension direction of the end section to the concaved groove, the end section being inclined to the connecting channel.

DETAILED DESCRIPTION OF THE EMBODIMENTS

Figure 1:
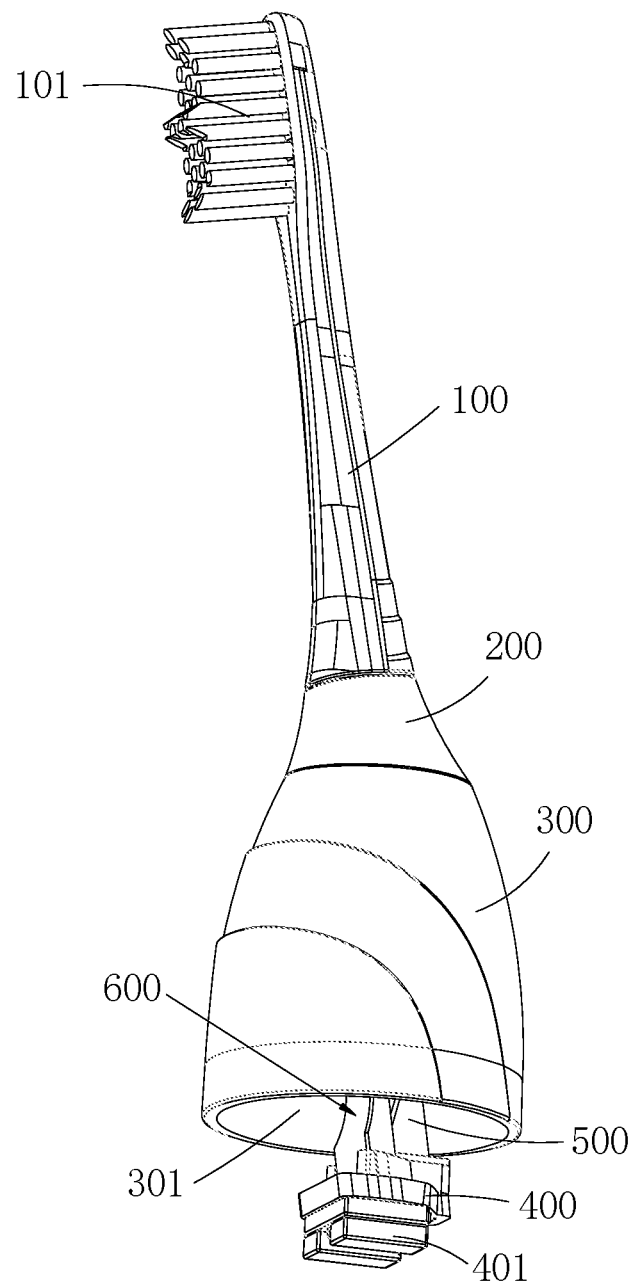
FIG. 1 is a perspective view of a magnetically driven electric toothbrush head according to one embodiment of the present disclosure.
Figure 2:
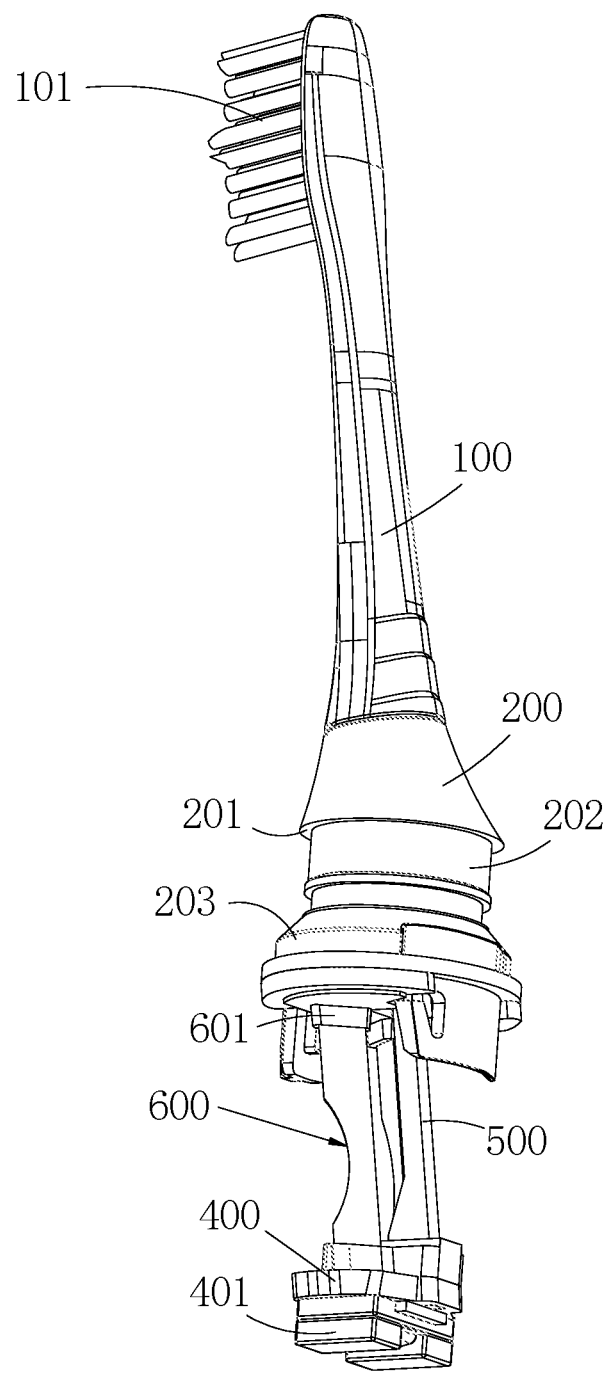
FIG. 2 is a partial perspective view of the magnetically driven electric toothbrush head according to one embodiment of the present disclosure.
Figure 3:
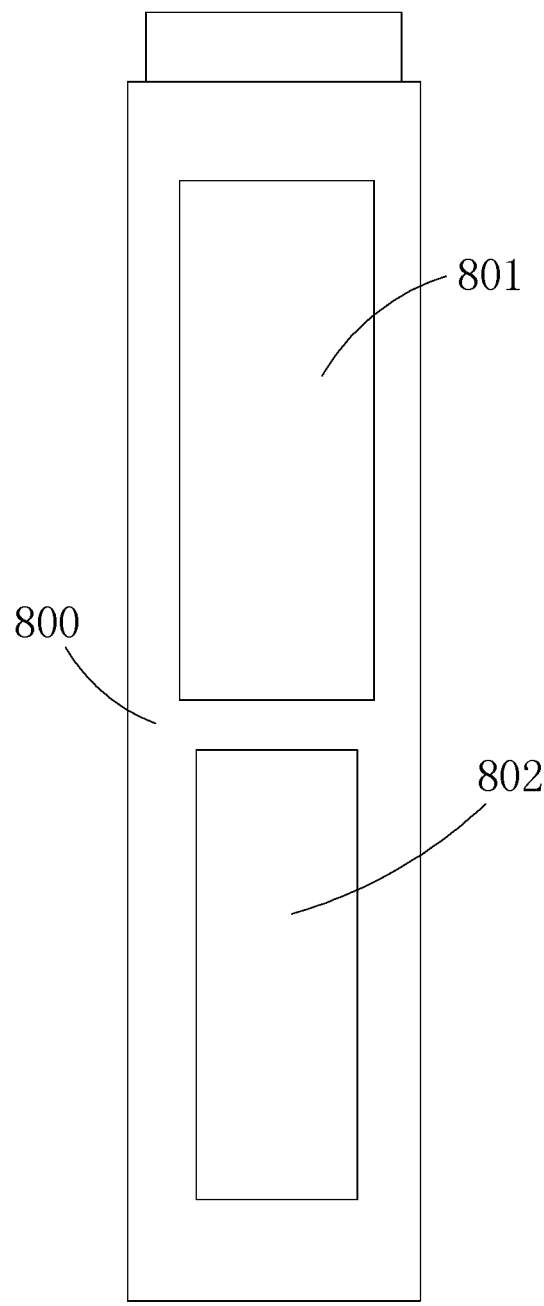
FIG. 3 illustrates a brush handle according to one embodiment of the present disclosure.
Figure 4:
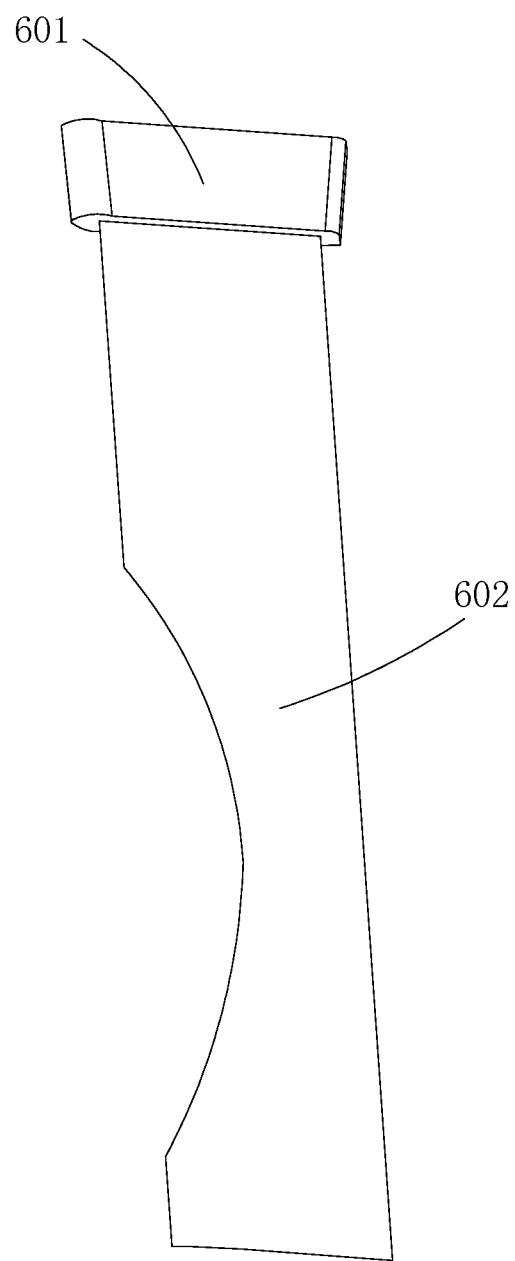
FIG. 4 illustrates a twisting plate according to one embodiment of the present disclosure.
Figure 5:
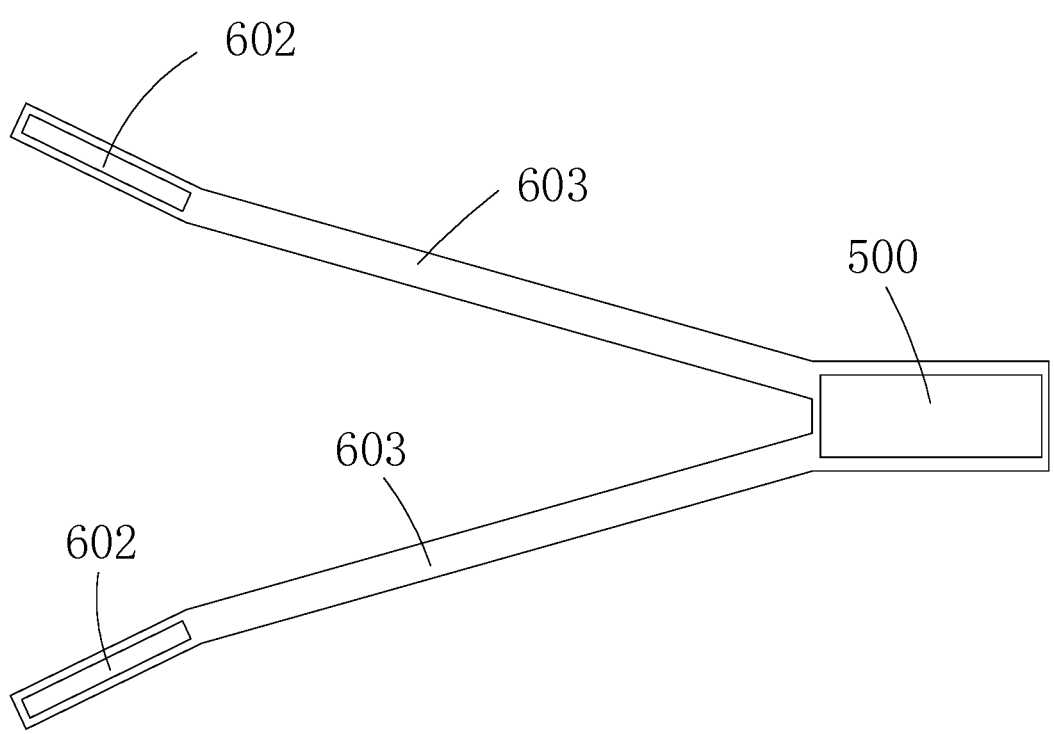
FIG. 5 illustrates cooperation of a twisting plate, a rubber strip and a driving shaft according to one embodiment of the present disclosure.

In order to make the purpose, technical scheme and advantages of the disclosure clearer, the following illustration and implementation examples are combined to further explain the disclosure. The specific embodiments described here are only used to explain the disclosure and are not used to limit the disclosure.

In the following, the realization of the disclosure is described in detail with specific embodiments.

The same or similar labels in the figures to this embodiment correspond to the same or similar components; in the description of the disclosure, if the orientation or position relationship indicated by the terms "upper", "lower", "left" and "right" is based on the orientation or position relationship shown in the figures, it is only for the convenience of describing the disclosure and simplifying the description, rather than indicating or suggesting that the device or component referred to must have a specific orientation, construct and operate in a specific orientation. Therefore, the terms used to describe the position relationship in the figures are only used for illustrative description and cannot be understood as a limitation to the disclosure. For ordinary technicians in this field, the specific meaning of the term can be understood on a case-by-case basis.

Referring to FIGS. 1-9, a preferred embodiment of the present disclosure is described below.

Referring to FIGS. 1-5, a magnetically driven electric toothbrush head according to this embodiment, includes a brush body 100, a movable board 400 arranged movably, and a screw cap 300. The screw cap 300 has a cavity 301 inside. A top of the screw cap 300 has a top opening in communication with the cavity 301. The cavity 301 extends through a top and a bottom of the screw cap 300 such that the screw cap 300 forms a hollow structure. An upper end of the brush body 100 is provided with brush hair 101. During the use of the magnetically driven electric toothbrush head, the brush hair 101 is used to clean the teeth of the user. The brush body 100 is set above the screw cap 300, and an elastic cover 200 is set between the lower end of the brush body 100 and the upper end of the screw cap 300. In this way, the brush body 100 and the screw cap 300 can move relatively.

A fixed frame 203 is fixedly arranged in the cavity 301 of the screw cap 300 while the movable board 400 can move relative to the screw cap 300. When driven by a magnetic force, the movable board 400 will move reciprocatingly and laterally. Between the fixed frame 203 and the movable board 400, two twisting plates 600 are arranged in intervals. The upper ends of the twisting plate 600 are fixedly connected with the fixed frame 203, and the lower ends of the twisting plate 600 are fixedly connected with the movable board 400. The resistance of the twisting plate 600 to distortion is less than the resistance to bending. In this way, when the movable board 400 is driven by magnetic force and swings back and forth, the twisting plates 600 will twist back and forth without bending.

The movable board 400 is connected with a driving shaft 500. The lower end of the driving shaft 500 is fixedly connected with the movable board 400. The upper end of the driving shaft 500 extends upward through the fixed frame 203 and the elastic cover 200, and fixedly connected with the lower end of the brush body 100. The driving shaft 500 and the fixed frame 203 are arranged at regular intervals, and the driving shaft 500 and the elastic cover 200 are arranged at regular intervals, too. In other words, there is no connection between the driving shaft 500 and the fixed frame 203 and no connection between the driving shaft 500 and the elastic cover 200. Therefore, the fixed frame 203 and the elastic cover 200 will not impose any restriction on the driving shaft 500.

The bottom of the movable board 400 is provided with two permanent magnets 401. The lower end of the screw cap 300 is fixed and connected to the upper end of the brush handle 800, and inside of the brush handle 800 is equipped with an electromagnet 801 and a battery 802. When the electromagnet 801 is electrified, under a magnetic effect between the electromagnet 801 and the two permanent magnets 401 and a distortion limit of the twisting plate 600, the movable board 400 drives the driving shaft 500 and the toothbrush body 100 to rotate synchronously and reciprocatingly.

When the electromagnet 801 is electrified, the magnetic effect between the electromagnet 801 and the permanent magnet 401 can drive the movable board 400 to move reciprocatingly and laterally. However, under the restriction of the twisting plates 600, the twisting plates 600 will be distorted during the movement of the movable board 400. Thus, the movable board 400 obtains a reciprocating rotation movement, which results in the driving shaft 500 fixedly connected to the movable board 400 rotating reciprocatingly, and consequently the brush body 100 rotating reciprocatingly. As a result, the toothbrush hair 101 on the brush body 100 also rotates reciprocatingly to clean the teeth.

The outer surface of the upper part of the twisting plate 600 is provided with a rubber sleeve 601 to form a limiting section, and the top of the rubber sleeve 601 is fixedly connected with the bottom of the fixed frame 203. In this way, the upper part of the twisting plate 600 is restricted by the rubber sleeve 601 not to be twisted. The lower part of the twisting plate 600 is exposed to form a twisting section 602. When the twisting plate 600 is twisted, the twisting amplitude of the twisting section 602 is greater than that of the limiting section. In this way, when the twisting plate 600 is driven to twist, its twisting motion is basically limited to the twisting section 602, which can increase the twisting amplitude of the twisting section 602 and consequently allows the twisting section 602 to drive the driving shaft 500 to rotate with an increased amplitude. Moreover, the twisting motion is basically limited to the twisting section 602, which can reduce the overall deformation of the twisting plate 600, greatly extend the service life of the twisting plate, and avoid the premature twisting failure of the twisting plate 600 which results in the failure of the electric toothbrush head to achieve the effect of cleaning the teeth.

The middle part of the twisting section 602 is connected to the driving shaft 500 with a rubber strip 603, and the rubber strip 603 is telescopic. One end of the rubber strip 603 is fixedly connected to the driving shaft 500, and the other end of the rubber strip 603 is wrapped on the middle part of the twisting section 602. Moreover, the rubber strip 603 is movably connected to the twisting section 602. When the movable board 400 moves in reciprocating motion, the two twisting plates 600 synchronously twists in the same direction. At the same time, the twisting plates 600 pull the rubber strip 603 to cause the rubber strip 603 to deform. During the deformation, the rubber strips 603 pull the driving shaft 500 synchronously and drive the movable board 400 for reciprocating rotation synchronously and reversely. In this way, not only the movable board 400 can drive the driving shaft 500 for reciprocating rotation in one direction, but also the elastic force generated by the deformation of the rubber strip 603 can drive the movable board 400 and the driving shaft 500 to do reciprocating rotation synchronously and reversely, which achieves the effect of double-driving. Driven by the movable board 400 and pulled by the rubber strip 603, the reciprocating rotation of the driving shaft 500 can be strengthen, and the reciprocating rotation path of the driving shaft 500 can be guided and the rotation trajectory is limited to thereby enhance the orderliness of the reciprocating rotation of the driving shaft 500.

As for the magnetically driven electric toothbrush head provided above, when the screw cap 300 is connected to the brush handle 800, under the magnetic drive between the electromagnet 801 and the permanent magnet 401 and the twisting limit of the twisting plates 600, the movable board 400 drives the driving shaft 500 to rotate reciprocatingly. By arranging the rubber sleeve 601 on the upper part of the twisting plate 600, the twisting movement of the twisting plate 600 can be basically limited to the twisting section 602, and the middle part of the twisting section 602 is connected with the driving shaft 500 via the rubber strips 603. The distortion of the twist section 602 results in deformation of the rubber strip 603, and the deformation of the rubber strip 603 drives the movable board 400 to rotate reciprocatingly, thereby strengthening the reciprocating rotation of the driving shaft 500, improving the performance of the magnetically driven electric toothbrush head, and increasing the service life of the magnetically driven electric toothbrush head.

Figure 6:
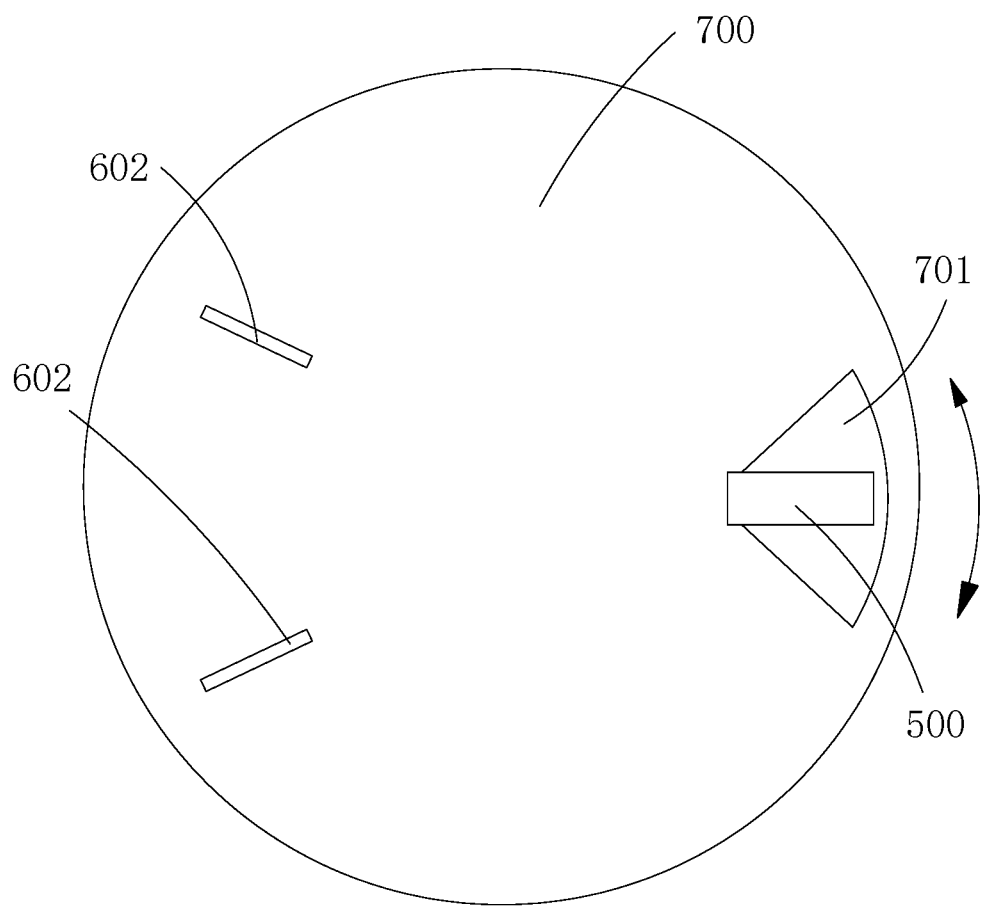
FIG. 6 illustrates connection of twisting plates, an elastic plate and a driving shaft according to one embodiment of the present disclosure.

Referring to FIG. 6, the top of the movable board 400 is provided with an elastic plate 700 with horizontal distortion due to be compressed, and the elastic plate 700 is arranged on the movable board 400. The lower end of the twisting section 602 extends through the elastic plate 700 and is fixedly connected with the elastic plate 700. A sector-shaped guide groove 701 is defined in the elastic plate 700. The driving shaft 500 movably passes through the guide groove 701. The sector-shaped guide groove 701 has an arc-shaped outer wall 703 and the radian of the outer wall 703 is same as that of the reciprocating rotation of the driving shaft 500.

Because the distortion amplitude of the lower end of the twisting section 602 is small, the distortion of the lower end of the twisting section 602 can be restricted/limited/reduced by setting the elastic plate 700 on the movable board 400, so that the distortion of the twisting section 602 is substantially concentrated in the middle part of the twisting section 602, and the distortion of the middle of the twisting section 602 is enhanced. Secondly, the arc-shape guide groove 701 can restrict and guide the reciprocating rotation trajectory of the driving shaft 500, so as to enhance the orderliness of the reciprocating rotation of the driving shaft 500.

Figure 7:
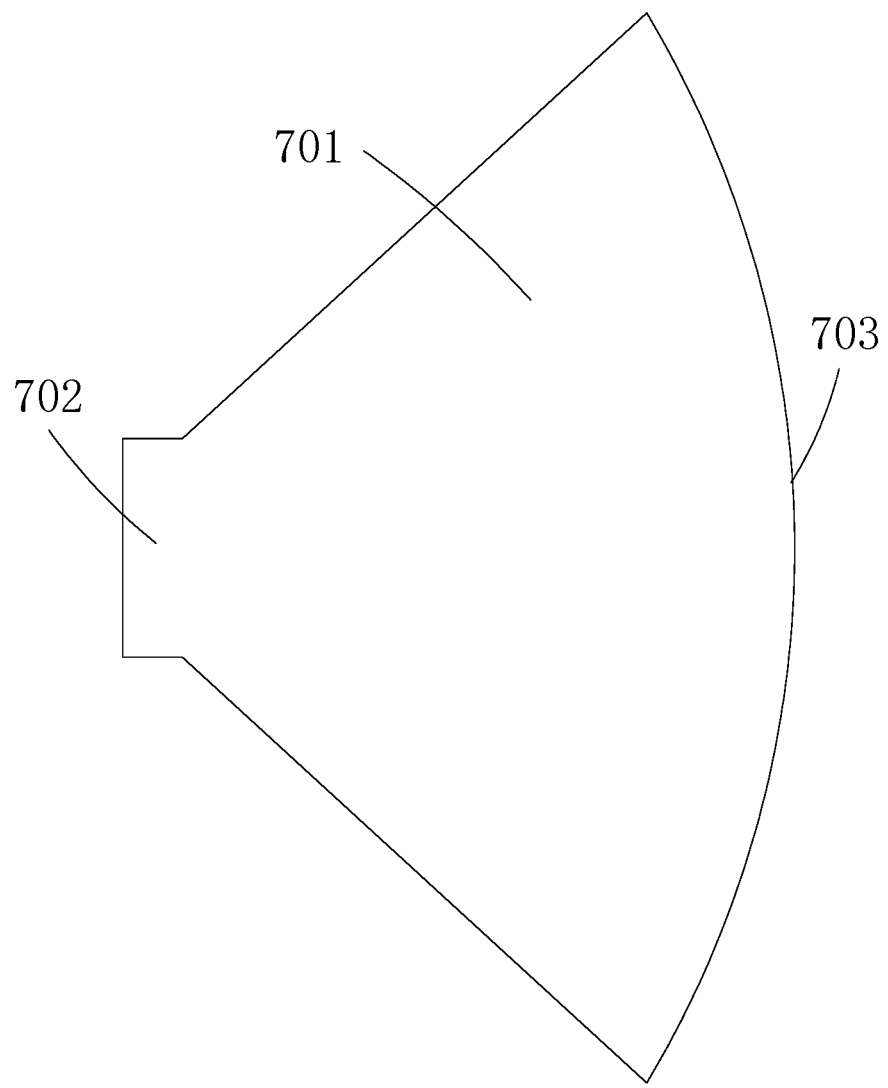
FIG. 7 illustrates a sector-shaped guide groove according to one embodiment of the present disclosure.

Referring to FIG. 7, the inner side of the guide groove 701 has a short inner wall, and the outer side of the sector-shaped guide groove 701 has a long arc-shaped outer wall 703. A limit groove 702 is defined in the middle of the short inner wall, and the driving shaft 500 is flat. The inner side of the driving shaft 500 is embedded in the limit groove 702, and abuts against the inner side of the limit groove 702. The outer side of the driving shaft 500 is oriented towards the long outer wall 703, and a gap is formed between the outer side of the driving shaft 500 and the long outer wall 703. When the electromagnet 801 in the brush handle 800 is energized, under the magnetic effect between the electromagnet 801 and the two permanent magnets 801 and the twisting restriction of the twisting plates 600, the outer side of the driving shaft 500 rotates reciprocating in the direction of arrow as shown in FIG. 6 with its inner side as the rotation center.

When the driving shaft 500 rotates in reciprocating motion, the driving shaft 500 is rotating with its inner side as the rotation center, and its outer side as the rotation arm. In this way, by setting the limit groove 702, the inner side of the driving shaft 500 is embedded in the limit groove 702, which can limit and guide the reciprocating motion of the driving shaft 500, and further ensure the orderliness of the reciprocating motion of the driving shaft 500.

Figure 8:
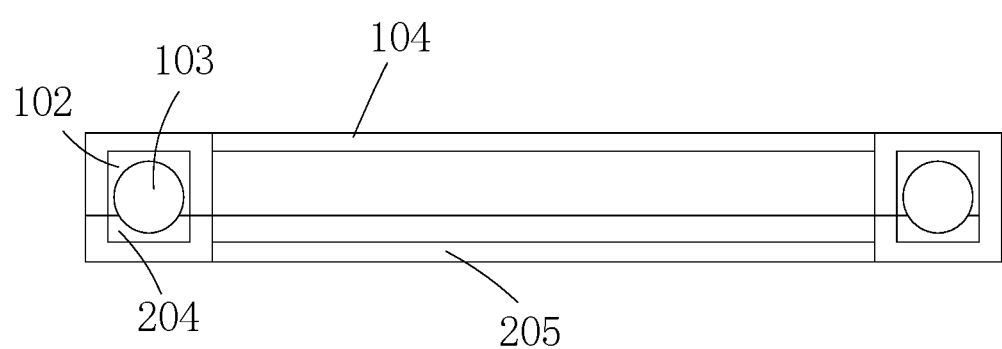
FIG. 8 illustrates cooperation of an upper ring groove, a lower ring groove and a rolling ball according to one embodiment of the present disclosure.

Referring to FIG. 8, the brush body 100 has a ring bottom portion 104, which is oriented downward. The elastic cover 200 has a ring top portion 205, which is oriented upward. The ring bottom portion 104 is connected to the ring top portion 205. An upper ring groove 102 is set in the ring bottom portion 104 and is sunken upward from the ring bottom portion, and a lower ring groove 204 is defined in the ring top portion 205 and is sunken downward. The upper ring groove 102 is aligned with the lower ring groove 204.

The upper ring groove 102 is provided with a rolling ball 103 that rolls circumferentially along the upper ring groove 102, the upper side of the rolling ball 103 is movably received in the upper ring groove 102. The lower part of the ball 103 extends downward beyond the upper ring groove 102, and the lower side of the ball 103 is movably received in the lower ring groove 204. In this way, during the reciprocating rotation of the driving shaft 500, a full surface matching between the bottom of the brush body 100 and the upper end of the elastic cover 200 is avoided. The rolling ball 103 is used to rotate in the upper ring groove 102 and the lower ring groove 204, which can enhance the smoothness and orderliness of the brush body 100 in the rotation process, and avoid the deformation of elastic cover 200 due to excessive friction during reciprocating rotation of brush body 100.

The bottom end of the elastic cover 200 has an annular step 201 oriented downward, and the annular step 201 abuts and contacts the top end of the screw cap 300, and is arranged surrounding the top opening of the cavity 301, so as to ensure the compactness and firmness of the connection between the elastic cover 200 and the screw cap 300, and the waterproof effect is improved. A connection part 202 extends downward from the bottom end of the elastic cover 200. The connection part 202 extends through the top opening of the cavity 301, surrounds the periphery of the fixed frame 203, and is fixedly connected with the fixed frame 203 to further enhance the waterproof effect between the elastic cover 200 and the screw cap 300. The connection of the fixed frame 203 and the elastic cover 200 can enhance the structural integrity of the magnetically driven electric toothbrush head.

Figure 9:
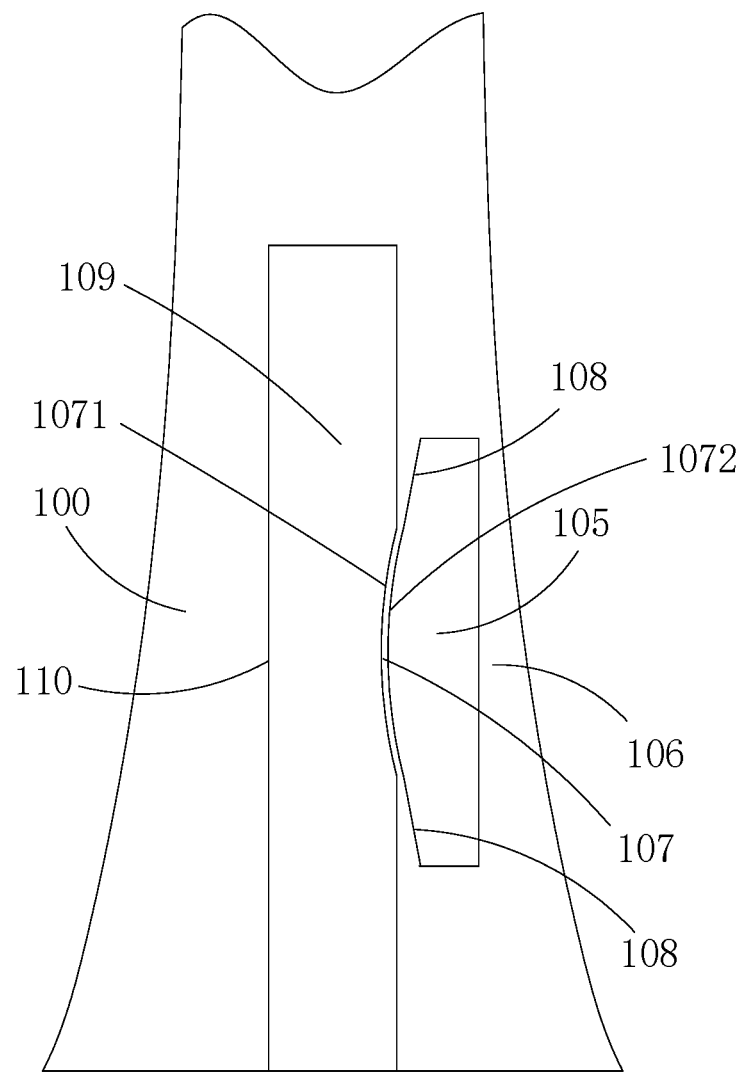
FIG. 9 is an internal view of a brush body according to one embodiment of the present disclosure.

Referring to FIG. 9, the driving shaft 500 has an inserting section that extends upward through the elastic cover 200. A connecting channel 109 is defined in the brush body 100 for insertion of the flat inserting section. The connecting channel 109 extends longitudinally and extends through the bottom of the brush body 100 to form an insertion opening at the bottom of the brush body 100. The inserting section is inserted into the connecting channel 109 through the insertion opening, so that the driving shaft 500 is fixedly connected with the brush body 100. A through groove 105 is transversely arranged in the brush body 100, and the through groove 105 transversely extends through the brush body 100. The through groove 105 is filled with elastic rubber block, and the elastic rubber block is in a compressed state so as to apply a restoring force to the side wall of the through groove 105.

A pressing wall 107 is formed between the through channel 105 and the connecting channel 109. The pressing wall 107 has an internal pressing surface facing the connecting channel 109 and an external pressing surface facing the through channel 105. The middle part of the internal pressing surface is convexed toward the connecting channel 109, forming a pressing bulge 1071. The brush body 100 has a limiting wall 106 opposite to the pressing wall 107. The pressing wall 107 and the limiting wall 106 are arranged on opposite sides of the through channel 105 respectively. When the inserting section is inserted into the connecting channel 109, the pressing bulge 1071 is squeezed towards the elastic rubber block, and the elastic rubber block is further compressed, and the restoring force of the pressure wall 107 to the inserting section is increased.

The inner side wall of the connecting channel 109 has a straight pressing surface 110 which is arranged opposite to the inner pressing surface, and the straight pressing surface 110 extends smoothly along the axial direction of the connecting channel 109. The inserting section has two opposite insertion sides. When the inserting section is inserted into the connecting channel 109 via the insertion opening, one of the insertion sides of the inserting section contacts and abuts against the straight pressing surface 110, and the other of the insertion sides of the inserting section abuts against the pressing bulge 1071.

When the inserting section is inserted into the connecting channel 109, one insertion side is pressed on the straight pressing surface 110, and the other insertion side is pressed against the pressing bulge 1071. Restoring force exerted on the pressing wall 107 by the elastic rubber block filled in the through groove 105 urges the pressing bulge 1071 of the pressing wall 107 towards the inserting section, which makes the inserting section be firmly clamped and fixed in the connecting channel 109. By directly forming the connecting channel 109 in the brush body 100, no additional insertion structure is needed, the structure is simple, and the cost is saved.

In the practical manufacturing, the brush body 100 with the through groove 105 can be placed in a mold, and the glue can be injected into the through groove 105 by high pressure through a glue injection channel, so that the through groove 105 is filled with elastic rubber block which is compressed.

The thickness of the limiting wall 106 is greater than that of the pressing wall 107 and the limiting wall 106 is thick enough to keep it from being deformed outward by the elastic rubber block. In this way, the compressed elastic rubber block can exert a reaction force on the pressing wall 107 to the maximum extent in a direction toward the connecting channel 109, making the pressing wall 107 and the straight compression surface 110 more firmly hold/sandwich the inserting section therebetween. And the resilience of the elastic rubber block applied to the pressing wall 107 is mostly/substantially concentrated in the position of the pressing bulge 1071.

The through groove 105 forms a groove opening on the outer wall of the brush body 100. The elastic rubber block has an end layer that seals the groove opening. The end layer is hardened, and the outer edge of the end layer is fixedly connected with the outer wall of the brush body 100. In this way, when the elastic rubber block is squeezed, it can be restricted to protrude towards the groove opening, to avoid destroying the elastic recovery ability of the whole elastic block.

As for a further preferred embodiment, a cover board can be provided to cover the groove opening. The cover board seals the groove opening from outside to inside, and is fixed to the outer wall of the brush body 100 by laser welding or adhesive fixation and so on.

The pressing wall 107 is curved, and the middle part of the external pressing surface of the pressing wall 107 is depressed toward the connecting channel 109, forming a depression groove 1072 corresponding to the pressing bulge 1071, and the elastic rubber block fills the depression groove 1072. When the pressing bulge 1071 is pressed by the inserting section, the pressing bulge 1071 will generate elastic deformation toward the through groove 105, thus, the elastic rubber block in the depression groove 1072 is firstly driven to deform due to being squeezed, which facilitates the elastic deformation of the pressure bulge 1071, and the recovery force of the elastic rubber block generated due to elastic deformation can be concentrated on the pressing bulge 1071, so that the pressing bulge 1071 can clamp the inserting section more stably.

The external pressing surface has an end section 108 in the upper and lower parts of the depression groove 1072. The end sections 108 extend to the depression groove 1072, and connect with the sidewall of the depression groove 1072. Along the extension direction of the end section 108 to the depression groove 1072, the end section 108 is inclined to the connecting channel 109. In this way, when the elastic rubber block is deformed by the pressure toward the limiting wall 106, the extruded elastic rubber block produces the restoring force toward pressing wall 107. Due to the inclined arrangement of the end section 108 towards the connecting channel 109, under the guidance of the inclined end section 108, the elastic rubber block can be concentrated and deformed towards the position of the depression groove 1072 more easily, so that the restoring force of the elastic rubber block is concentrated to the depression groove 1072, that is, the extrusion/pushing effect is concentrated on the pressing bulge 1071.

The foregoing is only a preferred embodiment of the disclosure and shall not be used to limit the disclosure. Any modification, equivalent replacement or improvement made within the spirit and principles of the disclosure shall be included within the scope of protection of the disclosure.

What is claimed is:

1. A magnetically driven electric toothbrush head, comprising:
    a brush body, a movable board arranged movably, and a screw cap; wherein, the screw cap has a cavity inside; a top of the screw cap has a top opening in communication with the cavity; an upper end of the brush body is provided with brush hair; the brush body is arranged above the screw cap, and an elastic cover is arranged between a lower end of the brush body and an upper end of the screw cap;
    wherein a fixed frame is fixed inside the cavity of the screw cap, the movable board is movable reciprocating laterally after magnetic drive, two twisting plates are arranged in intervals between the fixed frame and the movable board, an upper end of the twisting plate is fixedly connected with the fixed frame and a lower end of the twisting plate is fixedly connected with the movable board, and a resistance of the twisting plate to distortion is less than the resistance to bending;
    wherein the movable board is connected with a driving shaft, a lower end of the driving shaft is fixedly connected with the movable board, an upper end of the driving shaft extends upward through the fixed frame and the elastic cover and fixedly connected with a lower end of the brush body, the driving shaft is spaced from the fixed frame and the elastic cover respectively;
    wherein a bottom of the movable board is provided with two permanent magnets, a lower end of the screw cap is fixed and connected to an upper end of a brush handle, when an electromagnet in the tooth handle is electrified, under a magnetic effect between the electromagnet and the two permanent magnets and a distortion limit of the twisting plates, the movable board drives the driving shaft and the brush body to rotate synchronously and reciprocatingly; and
    wherein an upper outer of the twisting plate is provided with a rubber sleeve to form a limiting section, a top of the rubber sleeve is fixedly connected with a bottom of the fixed frame, a lower part of the twisting plate is exposed to form a twisting section, when the twisting plate is twisted, a twisting amplitude of the twisting section is greater than that of the limiting section, a middle part of the twisting section is connected to the driving shaft with a rubber strip, one end of the rubber strip is fixedly connected to the driving shaft, and the other end of the rubber strip is wrapped in a middle part of the twisting section, and the rubber strip is movably connected to the twisting section.

2. The magnetically driven electric toothbrush head according to claim 1, wherein, the movable board is provided, on its top, with an elastic plate with horizontal distortion due to compression, the elastic plate is movably arranged on the movable board, a lower end of the twisting section extends through the elastic plate and is fixedly connected with the elastic plate, a sector-shaped guide groove with an arc-shaped outer wall is defined in the elastic plate, the driving shaft movably moves through the sector-shaped guide groove, and a radian of the arc-shaped outer wall of the sector-shaped guide groove is same as that of the reciprocating rotation of the driving shaft.

3. The magnetically driven electric toothbrush head according to claim 2, wherein, an inner side of the sector-shaped guide groove has a short inner wall, an outer side of the sector-shaped guide groove has a long outer wall, a limit groove is defined in a middle of the short inner wall, the driving shaft is flat, an inner side of the driving shaft is embedded in the limit groove and is connected with an inner side of the limit groove, an outer side of the driving shaft is oriented towards the long outer wall, and a gap is formed between the driving shaft and the long outer wall; and
    wherein, when the electromagnet in the brush handle is energized, under a magnetic effect between the electromagnet and the two permanent magnets and a twisting restriction of the twisting plate, and the outer side of the driving shaft rotates reciprocatingly with its inner side as a rotation center.

4. The magnetically driven electric toothbrush head according to claim 1, wherein, a bottom end of the brush body has a ring bottom portion oriented downward, the elastic cover has a ring top portion abutting against the ring bottom portion of the brush body, an upper ring groove is defined in the ring bottom portion and is upward depressed, a lower ring groove is defined in the ring top portion and is downward depressed, and the upper ring groove is aligned with the lower ring groove; and
    wherein the upper ring groove is provided with a rolling ball that is capable of rolling circumferentially along the upper ring groove, and a lower side of the rolling ball is movably placed in the lower ring groove.

5. The magnetically driven electric toothbrush head according to claim 1, wherein, a bottom end of the elastic cover has an annular step oriented downward, the annular step is connected to a top of the screw cap and is arranged around a top opening of the cavity, a connection part extends downward from the bottom end of the elastic cover, and the connection part extends through the top opening of the cavity, surrounds the periphery of the fixed frame, and is fixedly connected with the fixed frame.

6. The magnetically driven electric toothbrush head according to claim 1, wherein, the driving shaft has a flat inserting section that extends upward through the elastic cover, a connecting channel is defined in the brush body for insertion of the flat inserting section, the connecting channel is arranged longitudinally and extends through a bottom of the brush body to form an insertion opening at the bottom of the brush body, a through groove transversely extends through the brush body, the through groove is filled with elastic rubber block which is in a compressed state;

wherein, a pressing wall is formed between the through channel and the connecting channel, the pressing wall has an internal pressing surface facing the connecting channel and an external pressing surface facing the through channel, a central part of the internal pressing surface is convexed towards the connecting channel to form a pressing bulge, the brush body has a limiting wall opposite to the pressing wall, and the pressing wall and the limiting wall are arranged on opposite sides of the through channel respectively;

wherein an inner side wall of the connecting channel has a straight pressing surface which is arranged facing to the internal pressing surface, the straight pressing surface extends along the axial direction of the connecting channel, the inserting section has two opposite insertion sides, and when the inserting section is inserted into the connecting channel via the insertion opening, one of the insertion sides of the inserting section contacts and abuts against the straight pressing surface, and the other of the insertion sides of the inserting section abuts against the pressing bulge.

7. The magnetically driven electric toothbrush head according to claim 6, wherein, a thickness of the limiting wall is greater than that of the pressing wall.

8. The magnetically driven electric toothbrush head according to claim 6, wherein, the through groove forms a groove opening on the outer wall of the brush body, the elastic rubber block has an end layer that seals the groove opening, the end layer is hardened, and an outer edge of the end layer is fixedly connected with the outer wall of the brush body.

9. The magnetically driven electric toothbrush head according to claim 6, wherein, the pressing wall is curved, a middle part of the external pressing surface of the pressing wall is depressed toward the connecting channel to form a concaved groove corresponding to the pressing bulge, and the elastic rubber block fills the concaved groove.

10. The magnetically driven electric toothbrush head according to claim 9, wherein, the external pressing surface has an end section in upper and lower parts of the concaved groove, the end section extends to the concaved groove and connects with the sidewall of the concaved groove, and along the extension direction of the end section to the concaved groove, the end section being inclined to the connecting channel.

* * * * *